United States Patent
Susca et al.

(10) Patent No.: US 12,435,715 B2
(45) Date of Patent: Oct. 7, 2025

(54) DIRECT CONTROLLED VARIABLE DISPLACEMENT PUMPS WITH THERMOSTATICALLY CONTROLLED BYPASS

(71) Applicant: Hamilton Sundstrand Corporation, Charlotte, NC (US)

(72) Inventors: Ryan Prescott Susca, Windsor, CT (US); Ryan Shook, Loves Park, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 34 days.

(21) Appl. No.: 18/202,477

(22) Filed: May 26, 2023

(65) Prior Publication Data

US 2024/0392775 A1 Nov. 28, 2024

(51) Int. Cl.
*F04B 49/24* (2006.01)
*F02C 7/22* (2006.01)
(Continued)

(52) U.S. Cl.
CPC .............. *F04B 49/24* (2013.01); *F02C 7/22* (2013.01); *F02C 9/30* (2013.01); *F04B 49/065* (2013.01); *F04B 49/16* (2013.01); *F04B 7/00* (2013.01); *F04B 49/002* (2013.01); *F04B 49/08* (2013.01); *F04B 2205/11* (2013.01)

(58) Field of Classification Search
CPC ........ F04B 49/24; F04B 49/065; F04B 49/16; F04B 7/00; F04B 49/002; F04B 49/08; F04B 2205/11; F04B 2205/09; F02C 7/22; F02C 9/30
See application file for complete search history.

(56) References Cited

U.S. PATENT DOCUMENTS 5,806,300 A * 9/1998 Veilleux, Jr. ........... F02M 37/04
60/734
6,966,180 B2 11/2005 Deneir et al.
(Continued)

FOREIGN PATENT DOCUMENTS

EP 4063654 A2 9/2022

OTHER PUBLICATIONS

Extended European Search Report dated Oct. 8, 2024, for corresponding European Patent Application No. 24177428.0, 10 pgs.

*Primary Examiner* — David N Brandt
(74) *Attorney, Agent, or Firm* — Kinney & Lange, P.A.

(57) ABSTRACT

A system includes a variable displacement pump (VDP) in fluid communication with an inlet line and with an outlet line. The VDP includes a variable displacement mechanism configured to vary pressure to the outlet line. A bypass valve (BPV) includes a BPV inlet in fluid communication with the outlet line, and a BPV outlet in fluid communication with a bypass line that feeds into the inlet line upstream of the VDP. The BPV includes a thermostatic actuator configured to control recirculation flow amount through the BPV based on fluid temperature in the BPV. A method includes thermostatically controlling a bypass valve (BPV) to recirculate flow from the outlet line to an input line of the VDP in the event of flow demanded by the downstream system dropping below a predetermined low threshold of flow through the VDP based on fluid temperature in the BPV.

16 Claims, 1 Drawing Sheet

(51) Int. Cl.
*F02C 9/30* (2006.01)
*F04B 7/00* (2006.01)
*F04B 49/00* (2006.01)
*F04B 49/06* (2006.01)
*F04B 49/08* (2006.01)
*F04B 49/16* (2006.01)

(56) References Cited

U.S. PATENT DOCUMENTS

| | | |
|---|---|---|
| 9,617,923 B2 * | 4/2017 | Griffiths .................... F02C 9/30 |
| 2004/0200459 A1 | 10/2004 | Bennett et al. |
| 2008/0289338 A1 | 11/2008 | Desai |
| 2010/0089026 A1 * | 4/2010 | Baker ....................... F02C 9/30 |
| | | 137/565.29 |
| 2010/0116465 A1 * | 5/2010 | Jainek ..................... F28F 27/02 |
| | | 29/726 |
| 2013/0098022 A1 | 4/2013 | Kim et al. |
| 2018/0340501 A1 * | 11/2018 | Ni ........................... F04B 49/08 |
| 2018/0372006 A1 * | 12/2018 | Chalaud ................... F02C 9/38 |
| 2022/0372968 A1 | 11/2022 | O'Rorke et al. |

* cited by examiner

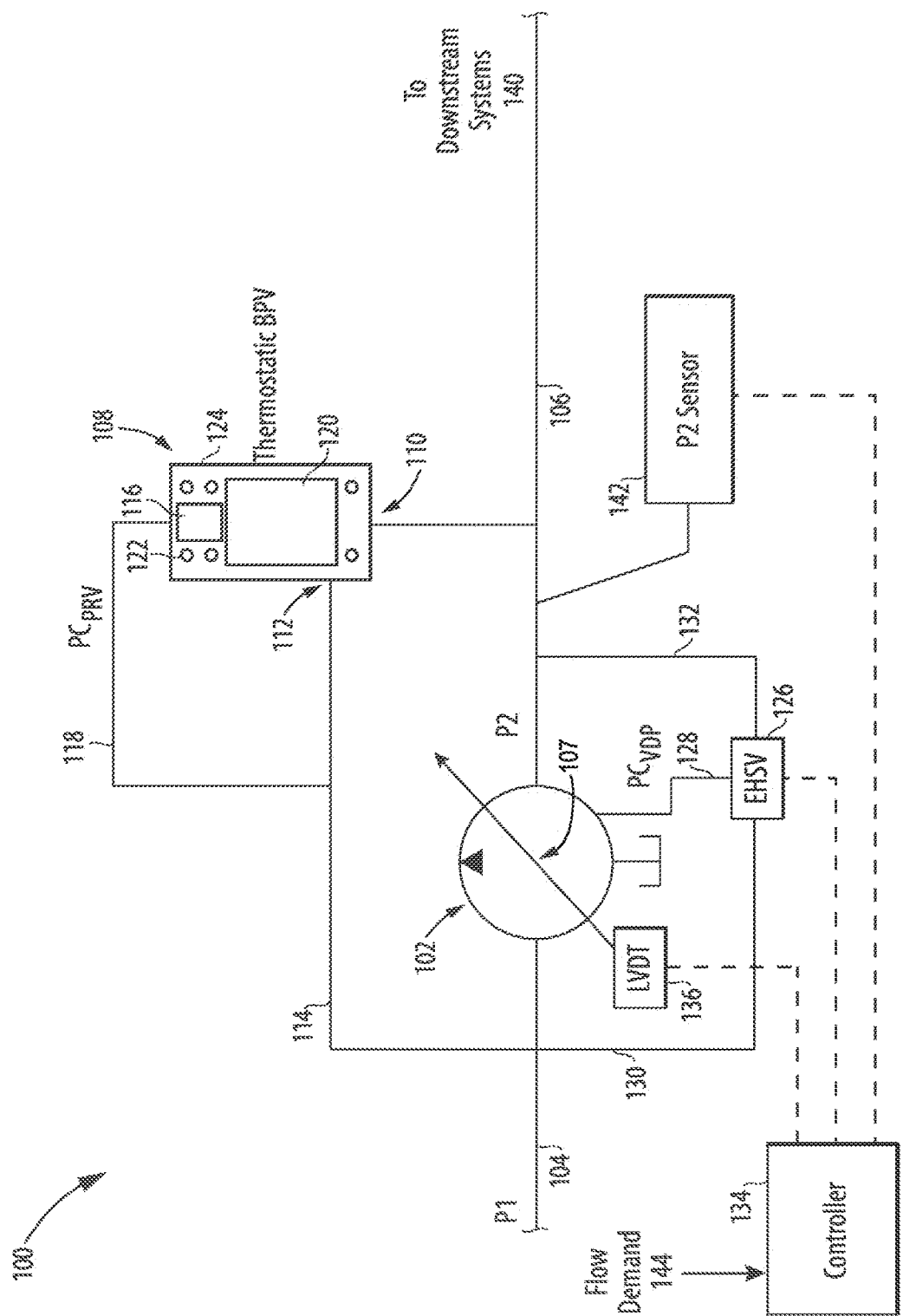

DIRECT CONTROLLED VARIABLE DISPLACEMENT PUMPS WITH THERMOSTATICALLY CONTROLLED BYPASS

BACKGROUND

1. Field

The present disclosure relates to pump control, and more particularly to control for variable displacement pumps (VDPs).

2. Description of Related Art

Variable displacement pumps (VDPs) with large enough displacements can struggle to function with high turn down ratios required for most fuel metering systems, e.g. in aerospace applications. This is because the minimum pump flows that can support adequate cooling can be higher than the minimum flows required by the high turn down ratio.

The conventional techniques have been considered satisfactory for their intended purpose. However, there is an ever present need for improved systems and methods for control of VDPs, e.g. to provide for higher turn down ratios and the like. This disclosure provides a solution for this need.

SUMMARY

A system includes a variable displacement pump (VDP) in fluid communication with an inlet line and with an outlet line. The VDP includes a variable displacement mechanism configured to vary pressure to the outlet line. A bypass valve (BPV) includes a BPV inlet in fluid communication with the outlet line, and a BPV outlet in fluid communication with a bypass line that feeds into the inlet line upstream of the VDP. The BPV includes a thermostatic actuator configured to control recirculation flow amount through the BPV based on fluid temperature in the BPV.

The BPV can include a sensing line connecting the thermostatic actuator in fluid communication with the bypass line to expose the thermostatic actuator to fluid temperatures of fluids in the BPV. The thermostatic actuator can include a thermally bistable or thermally variable structure operatively connected to adjust position of a valve member in the BPV to adjust recirculation flow rate through the BPV.

An electrohydraulic servo valve (EHSV) can be connected in fluid communication with the variable displacement mechanism by a control line for control of flow through the VDP. The EHSV can be connected in fluid communication with both the inlet line and with the outlet line through respective connection lines. The EHSV can be operatively connected to a controller for active control of the EHSV to actuate the variable displacement mechanism to control flow through the VDP. A position sensor can be operatively connected to the variable displacement mechanism to provide sensor output indicative of position of the variable displacement mechanism. The position sensor can be operatively connected to the controller to provide feedback for controlling the variable displacement mechanism. The position sensor can include a linear variable differential transformer (LVDT). The controller can be operatively connected to receive input indicative of flow demanded by the downstream system supplied by the outlet line. A pressure sensor can be operatively connected to the outlet line to generate sensor output indicative of pressure in the outlet line. The pressure sensor can be operatively connected to the controller for active control of the variable displacement mechanism based on pressure in the outlet line.

A method includes receiving input indicative of flow demanded by a downstream system supplied from an outlet line of a variable displacement pump (VDP). The method includes thermostatically controlling a bypass valve (BPV) to recirculate flow from the outlet line to an input line of the VDP in the event of flow demanded by the downstream system dropping below a predetermined low threshold of flow through the VDP based on fluid temperature in the BPV.

The method can include receiving a input for flow demand below a minimum flow rate for the VDP, reducing flow through the VDP to the minimum flow rate, raising fluid temperature in the BPV, and actuating the BPV to increase recirculation flow by movement of a thermally bistable or thermally variable structure operatively connected to adjust position of a valve member in the BPV. The method can include increasing flow rate through the VDP to meet the flow demand and the recirculation flow. Increasing flow rate through the VDP can include reducing fluid temperature in the VDP. Reducing fluid temperature in the VDP can include actuating the BPV to decrease recirculation flow by movement of the thermally bistable or thermally variable structure. The method can include receiving data from a sensor indicative of position of a variable displacement mechanism of the VDP, wherein controlling displacement includes controlling displacement of the VDP based on position of the variable displacement mechanism.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 1 is a schematic view of an embodiment of a system constructed in accordance with the present disclosure, showing the connections of the variable displacement pump (VDP) and a bypass valve (BPV) with a thermostatic control.

DETAILED DESCRIPTION OF THE PREFERRED EMBODIMENTS

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. The systems and methods described herein can be used to provide for passive temperature based control of variable displacement pumps, such as for use in supplying fuel to gas generators in aircraft engines.

The system 100 includes a variable displacement pump (VDP) 102 in fluid communication with an inlet line 104 and with an outlet line 106. The VDP 102 includes a variable displacement mechanism 107 configured to vary pressure to the outlet line 106, e.g. to supply downstream systems with fluid elevated from the pressure P1 of the inlet line 104 to the outlet pressure P2 of the outlet line 106. A bypass valve (BPV) 108 includes a BPV inlet 110 in fluid communication with the outlet line 106, and a BPV outlet 112 in fluid communication with a bypass line 114 that feeds into the inlet line 104 upstream of the VDP 102. The BPV 108 includes a thermostatic actuator 116 configured to control recirculation flow amount through the BPV 108 from the BPV inlet 110 to the BPV outlet 112 based on fluid temperature in the BPV 108. The BPV includes a sensing line 118 connecting the thermostatic actuator 116 in fluid communication with the bypass line 114. The sensing line 118 serves as a pressure reference, so that opening pressure (OP) of the BPV 108 is governed by OP=Pref+Pspring, where Pref is the pressure in the sensing line 118 and Pspring is the pressure required to overcome the biasing member 122 and thermostatic actuator 116 of the BPV 108, to ensure the VDP 102 is always operating with a certain minimum pressure rise. The line 118 can be utilized in at least the two following ways. First, the line 118 is constantly connected to the backside of the BPV 108 and the thermostatic actuator 116 can modify Pspring to be anywhere between Pspringmin and Pspringmax (which can be infinite as the BPV 108 could be mechanically locked closed). Second, the line 118 can be intermittently connected to the backside of the BPV 108, wherein the thermostatic actuator 116 opens/closes the flow port at the backside of the BPV 108 (the BPV 108 cannot open when thermostatic actuator 116 closes the port of line 118 because it is hydraulically locking the valve member 120 in place).

The thermostatic actuator 116 includes a thermally bistable or thermally variable structure, e.g. a bi-metallic element or the like, operatively connected to adjust position of a valve member 120 in the BPV 108 to adjust recirculation flow rate through the BPV 108 from the BPV inlet 110 to the BPV outlet 112, e.g. versus spring forces from one or more biasing members 122 operatively connected between the valve member 120 and a housing 124 of the BPV. The biasing member or members 122 can bias the BPV in the downward direction as oriented in FIG. 1 to close off flow from the BPV inlet 110 to the BPV outlet 112 unless the temperatures rise to a point to alter state of the thermostatic actuator 116 as further described below.

An electrohydraulic servo valve (EHSV) 126 is connected in fluid communication with the variable displacement mechanism 107 by a control line 128 for control of flow through the VDP 102. The EHSV 126 is connected in fluid communication with both the inlet line 104 and with the outlet line 106 through respective connection lines 130, 132. The EHSV 126 is operatively connected to a controller 134 for active control of the EHSV 126, as indicated by a broken line in FIG. 1, to actuate the variable displacement mechanism 107 to control flow through the VDP 102. A position sensor 136 is operatively connected to the variable displacement mechanism 107 to provide sensor output indicative of position of the variable displacement mechanism 107. The position sensor 136 is operatively connected to the controller 134 to provide feedback for controlling the variable displacement mechanism 107 as indicated in FIG. 1 by a broken line. The position sensor 138 can include a linear variable differential transformer (LVDT) or any other suitable type of sensor. The controller 134 is operatively connected to receive input 144 indicative of flow demanded by the downstream system or systems 140 supplied by the outlet line 106, as indicated by a broken line in FIG. 1. A pressure sensor 142 is operatively connected to the outlet line 106 to generate sensor output indicative of pressure in the outlet line 106. The pressure sensor 142 is operatively connected to the controller 134 for active control of the variable displacement mechanism 107 based on pressure (P2) in the outlet line 106, as indicated by a broken line in FIG. 1.

A method includes receiving input 144 indicative of flow demanded by a downstream system or systems 140 supplied from an outlet line 106 of the VDP 102. The method includes thermostatically controlling the BPV 108 to recirculate flow from the outlet line 106 to the input line 104 of the VDP 102 in the event of flow demanded by the downstream system(s) 140 dropping below a predetermined low threshold of flow through the VDP 102 based on fluid temperature in the BPV 108.

The method includes receiving input 144 for flow demand below a minimum flow rate for the VDP 102, reducing flow through the VDP 102 to the minimum flow rate, which raises fluid temperature in the BPV 108, and results in actuation of the BPV 108 to increase recirculation flow by movement of the thermally bistable or thermally variable structure 116 operatively connected to adjust position of a valve member 120 in the BPV 108. The increase in bypass flow leads to increasing flow rate through the VDP 102 above its minimum flow to meet the flow demand plus the recirculation flow, which reduces fluid temperature in the VDP 102. Reducing fluid temperature in the VDP 102 includes actuating the BPV 120 back to its initial state to decrease recirculation flow by movement of the thermally bistable or thermally variable structure 116. The method includes receiving data from a sensor 136 indicative of position of a variable displacement mechanism 107 of the VDP 102, wherein controlling displacement includes controlling displacement of the VDP 102 based on position of the variable displacement mechanism 107.

Utilizing a variable displacement pump with direct pump displacement control and a pressure sensor, a pump position is set to maintain a pressure and flow schedule to support flow demands, e.g. for a gas generator or augmentor of an aircraft. Pump minimum displacement is set to operating needs, e.g. for an aircraft engine. Whenever demanded flows, e.g. for a desired fuel burn, are less than the minimum pump flow for adequate pump heat rejection, the pump outlet fluid temperature will increase until a thermostatically controlled bypass valve opens to a fixed area. This additional leak path will reduce pump flow to the downstream system or systems and the controller therefore increases pump displacement temporarily to satisfy flow demand and pump cooling, until pump outlet fluid temperatures decrease sufficiently and BPV closes or operating condition, e.g. of an engine, changes.

Systems and method as disclosed herein provide potential benefits including the following. They can eliminate costly active control system for pump bypass flow. Pumps can go to minimum requested flows during transient conditions for more stable transient operation. Systems and methods as disclosed herein can reduce the count of inputs and outputs to a pump controller.

The methods and systems of the present disclosure, as described above and shown in the drawings, provide for passive temperature based control of variable displacement pumps, such as for use in supplying fuel to gas generators in aircraft engines. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A system comprising:
a variable displacement pump (VDP) in fluid communication with an inlet line and with an outlet line; and
a bypass valve (BPV) including a BPV inlet in fluid communication with the outlet line, and a BPV outlet in fluid communication with a bypass line that feeds into the inlet line upstream of the VDP, wherein the BPV includes a thermostatic actuator configured to control recirculation flow amount through the BPV based on fluid temperature in the BPV; and
wherein the BPV includes a sensing line connecting the thermostatic actuator in fluid communication with the bypass line.

2. The system as recited in claim 1, wherein the thermostatic actuator includes a thermally bistable or thermally variable structure operatively connected to adjust a position of a valve member in the BPV to adjust a recirculation flow rate through the BPV.

3. The system as recited in claim 1, further comprising an electrohydraulic servo valve (EHSV) connected in fluid communication with a control line for control of flow through the VDP.

4. The system as recited in claim 3, wherein the EHSV is connected in fluid communication with both the inlet line and with the outlet line through respective connection lines, wherein the EHSV is operatively connected to a controller for active control of the EHSV to control the flow through the VDP.

5. The system as recited in claim 4, further comprising a pressure sensor operatively connected to the outlet line to generate a sensor output indicative of pressure in the outlet line, wherein the pressure sensor is operatively connected to the controller for active control of the VDP based on the pressure in the outlet line.

6. A method of operating the system of claim 1, the method comprising:
receiving input indicative of flow demanded by a downstream system supplied from the outlet line of the VDP; and thermostatically controlling the BPV to recirculate flow from the outlet line to the input line of the VDP in the event of flow demanded by the downstream system dropping below a predetermined low threshold of flow through the VDP based on the fluid temperature in the BPV.

7. The method as recited in claim 6, further comprising in response to the input indicative of the flow demanded being below a minimum flow rate for the VDP, reducing the flow through the VDP to the minimum flow rate, raising the fluid temperature in the BPV, and actuating the BPV to increase the recirculation flow by movement of a thermally bistable or thermally variable structure operatively connected to adjust position of a valve member in the BPV.

8. The method as recited in claim 7, further comprising increasing the flow rate through the VDP to meet the flow demand and the recirculation flow.

9. The method as recited in claim 8, wherein increasing the flow rate through the VDP includes reducing fluid temperature in the VDP.

10. The method as recited in claim 9, wherein reducing the fluid temperature in the VDP includes actuating the BPV to decrease the recirculation flow by movement of the thermally bistable or thermally variable structure.

11. A system comprising:
an inlet line;
an outlet line;
a variable displacement pump (VDP) in fluid communication with the inlet line and with the outlet line;
a bypass valve (BPV) comprising:
a BPV housing;
a valve member in the BPV housing;
a BPV inlet formed in the BPV housing and in fluid communication with the outlet line;
a BPV outlet formed in the BPV housing, wherein the BPV outlet is in fluid communication with the BPV inlet when the valve member is in an open position within the BPV housing, and wherein the BPV outlet is fluidically disconnected from the BPV inlet when the valve member is in a closed position in the BPV housing;
a flow port formed in a backside of the BPV housing; and
a thermostatic actuator between the valve member and the backside of the BPV housing;
a bypass line fluidically connecting the BPV outlet to the inlet line upstream of the VDP, and
a sensing line fluidically connecting the flow port to the bypass line.

12. The system as recited in claim 11, wherein the thermostatic actuator includes a thermally bistable or thermally variable structure connected to the valve member and configured to adjust the valve member in the BPV housing between the closed position and the open position to adjust a recirculation flow rate through the BPV inlet and BPV outlet.

13. The system of claim 12, wherein the thermostatic actuator closes the flow port when the valve member is in the closed position in the BPV housing.

14. The system of claim 13, wherein the flow port is open when the valve member is in the open position in the BPV housing.

15. The system as recited in claim 12, further comprising:
a control line for control of flow through the VDP; and
an electrohydraulic servo valve (EHSV) connected in fluid communication with the control line.

16. The system as recited in claim 15, wherein the EHSV is connected in fluid communication with both the inlet line and with the outlet line through respective connection lines, wherein the EHSV is operatively connected to a controller for active control of the EHSV and the control line to control flow through the VDP.

* * * * *